United States Patent
Pandy et al.

(10) Patent No.: US 9,065,088 B2
(45) Date of Patent: Jun. 23, 2015

(54) MODIFICATION TO STAMPABLE FLOWFIELDS TO IMPROVE FLOW DISTRIBUTION IN THE CHANNELS OF PEM FUEL CELLS

(75) Inventors: Arun Pandy, Enfield, CT (US); Louis Chiappetta, Jr., South Windsor, CT (US); Robert Mason Darling, South Windsor, CT (US); Mallika Gummalla, Longmeadow, MA (US)

(73) Assignees: Audi AG, Ingolstadt (DE); Toyota Jidosha Kabushiki Kaisha, Toyota-shi (JP)

( * ) Notice: Subject to any disclaimer, the term of this patent is extended or adjusted under 35 U.S.C. 154(b) by 269 days.

(21) Appl. No.: 13/635,425

(22) PCT Filed: May 11, 2010

(86) PCT No.: PCT/US2010/034337
§ 371 (c)(1),
(2), (4) Date: Sep. 15, 2012

(87) PCT Pub. No.: WO2011/142745
PCT Pub. Date: Nov. 17, 2011

(65) Prior Publication Data
US 2013/0011770 A1    Jan. 10, 2013

(51) Int. Cl.
*H01M 8/02* (2006.01)
*H01M 8/04* (2006.01)
*H01M 8/10* (2006.01)

(52) U.S. Cl.
CPC .......... *H01M 8/0254* (2013.01); *H01M 8/0258* (2013.01); *H01M 8/026* (2013.01); *H01M 2008/1095* (2013.01); *Y02E 60/50* (2013.01)

(58) Field of Classification Search
CPC . H10M 2/0254; H10M 2/0258; H10M 2/026; H10M 2008/1095
USPC .......................................................... 429/514
See application file for complete search history.

(56) References Cited

U.S. PATENT DOCUMENTS

| 8,003,278 B2 | 8/2011 | Ushio et al. |
| 8,524,416 B2 | 9/2013 | Ishida et al. |

(Continued)

FOREIGN PATENT DOCUMENTS

| JP | 2005-141979 A | 6/2005 |
| JP | 2007-26899 A | 2/2007 |

(Continued)

OTHER PUBLICATIONS

International Preliminary Report on Patentability for PCT/US2010/034337 dated Nov. 22, 2012.

(Continued)

*Primary Examiner* — Sean P Cullen
(74) *Attorney, Agent, or Firm* — Seed IP Law Group PLLC

(57) ABSTRACT

A fuel cell device includes a plurality of channels that have at least one unrestricted inlet, a conduit for directing a flow having a distribution pattern to the unrestricted inlet, and a gap region between the conduit and the plurality of channels for receiving the flow distribution pattern, the gap region having such dimensions in which the distribution pattern tends to normalize within the gap region so that flow to each of the unrestricted inlets tends to normalize across said gap region.

6 Claims, 2 Drawing Sheets

(56) References Cited

U.S. PATENT DOCUMENTS

| | | | |
|---|---|---|---|
| 2004/0115512 A1* | 6/2004 | Fujii et al. | 429/38 |
| 2005/0271909 A1 | 12/2005 | Bai et al. | |
| 2006/0134502 A1 | 6/2006 | Garceau | |
| 2006/0216572 A1* | 9/2006 | Yoshida et al. | 429/38 |
| 2007/0166596 A1 | 7/2007 | Benson | |
| 2007/0207371 A1* | 9/2007 | Ushio et al. | 429/38 |
| 2007/0207372 A1* | 9/2007 | Kikuchi et al. | 429/38 |
| 2008/0292938 A1* | 11/2008 | Perry et al. | 429/34 |
| 2010/0129694 A1 | 5/2010 | Sugiura et al. | |
| 2010/0260928 A1 | 10/2010 | Hasegawa et al. | |

FOREIGN PATENT DOCUMENTS

| | | |
|---|---|---|
| JP | 2007141695 A | 6/2007 |
| JP | 2007-234543 A | 9/2007 |
| JP | 2008226657 A | 9/2008 |
| JP | 2009-37948 A | 2/2009 |
| JP | 2009110838 A | 5/2009 |
| JP | 2009-123352 A | 6/2009 |
| JP | 2009-283267 A | 12/2009 |
| JP | 2010-129265 A | 6/2010 |
| KR | 2006-0086983 A | 8/2006 |
| KR | 10-0741790 B1 | 7/2007 |

OTHER PUBLICATIONS

International Search Report, mailed Jan. 25, 2010, for International Application No. PCT/US2010/034337, 3 pages.

* cited by examiner

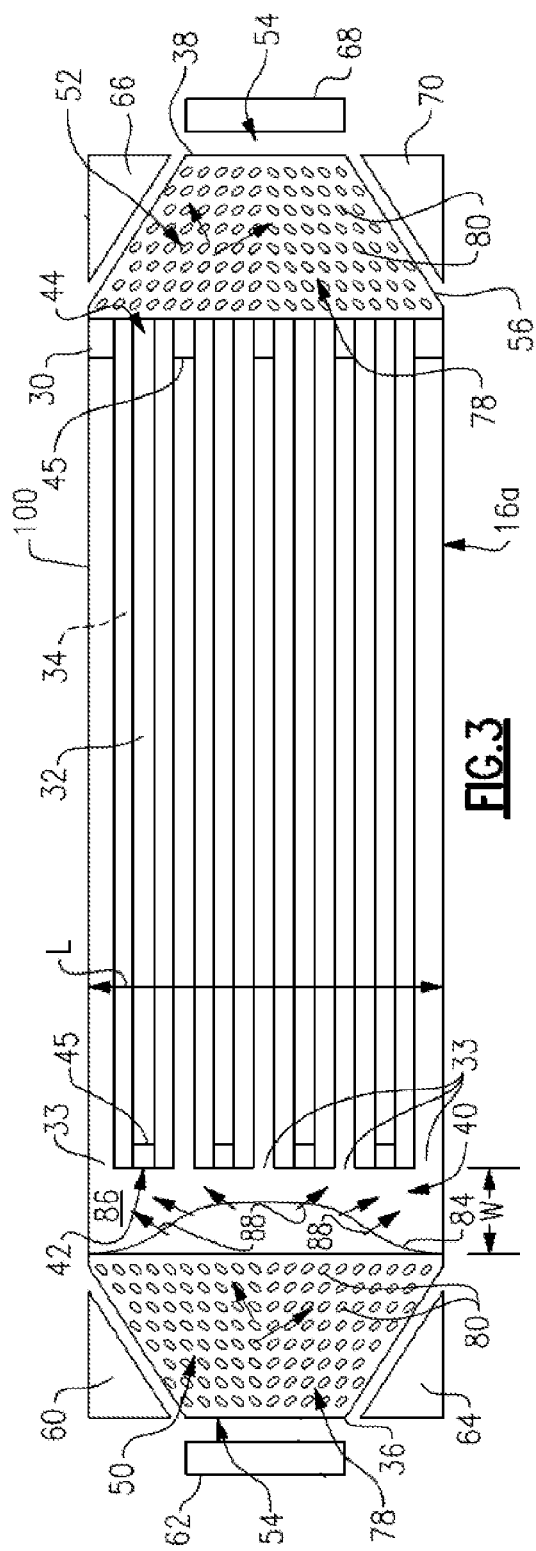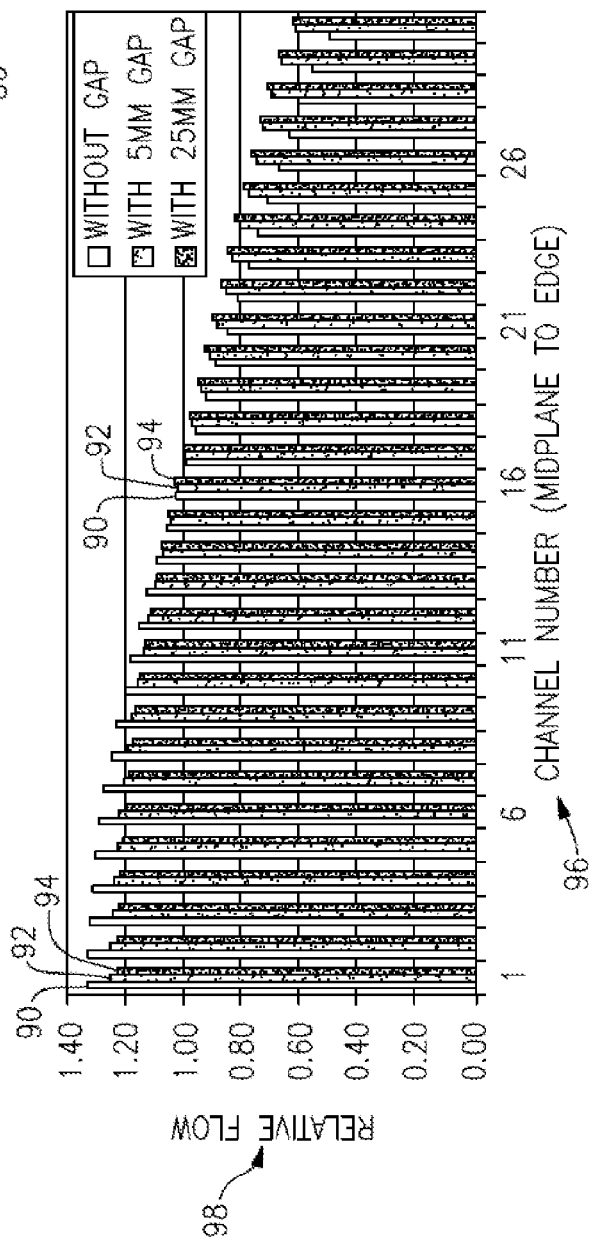

MODIFICATION TO STAMPABLE FLOWFIELDS TO IMPROVE FLOW DISTRIBUTION IN THE CHANNELS OF PEM FUEL CELLS

RELATED APPLICATION

This application claims priority to U.S. International Application No. PCT/US2010/03433, filed May 11, 2010.

FIELD OF THE INVENTION

This invention generally relates to fuel cells and, more particularly, to flow fields for fuel cells.

DESCRIPTION OF THE RELATED ART

Fuel cells are widely known and used for generating electricity in a variety of applications. A typical fuel cell utilizes reactant gases, such as hydrogen, and oxygen from air to generate an electrical current. Typically, the fuel cell includes adjacent flow fields that receive fuel, oxidant, and coolant. The fuel and oxidant flow fields distribute the reactant gases through adjacent gas distribution layers to a respective anode catalyst layer or a cathode catalyst layer adjacent an electrolyte layer to generate the electrical current. The electrolyte layer can be any layer that effectively transports ions, but does not conduct electrons. Some example fuel-cell electrolytes include: alkaline solutions (e.g., KOH), proton-exchange membranes (PEM), phosphoric acid, and solid oxides.

One type of flow field includes entrance channels that are interdigitated with exit channels. The entrance channels may have either fully or partially open inlets and fully or partially closed outlets and the exit channels have fully or partially closed inlets and fully or partially open outlets. The fully or partially closed outlets of the entrance channels force a reactant gas entering the entrance channels to flow through the gas distribution layer into an adjacent exit channel.

A typical flow field includes parallel channels that have fully open inlets and fully open outlets. A reactant gas entering though the channel diffuses through the gas distribution layer toward the catalyst. The open channels allow relatively unrestricted reactant gas flow and thereby produce a relatively low reactant gas pressure drop. Poor distribution of reactant gases amongst the inlet channels can lead to poor performance. The inlet manifolds, which communicate with all of the cells in a stack, must be designed to ensure that all cells receive substantially the same flow. Within each cell, there may be an inlet region located between the manifolds and the flow channels. Current is typically allowed to pass through this inlet region, but this region may also be inactive. In both cases, the inlet region is designed to ensure that all channels in each cell receive substantially the same flow. It is also possible to homogenize flow over the active area by designing each of the channels with different cross-sectional areas.

Some flow fields have manifolds and inlets that direct reactant to the fuel cell channels in a uniform manner. Other flow fields have channels with variable depth and/or area to normalize flow within a fuel cell field.

SUMMARY

This invention addresses a need for improved uniformity of flow among channels in a fuel cell field.

One exemplary device for use in a fuel cell includes a plurality of channels that have at least one entry way, a conduit for directing a flow having a distribution pattern to the entryways and an opening between the conduit and the entry ways for receiving the flow distribution pattern, the opening having such dimension in which the distribution pattern tends to become uniform within the opening so that flow to each of the entry ways tends to be equal.

One exemplary method for equalizing reactant flowing through a fuel cell field includes directing a flow having a distribution pattern through a conduit to a portion of a fuel cell field having a plurality of entry ways for receiving the flow and, receiving the flow in an opening between the conduit and the entry ways in which the distribution pattern tends to become uniform within the gap so that flow to each of the openings tends to become uniform.

The above examples are not intended to be limiting. Additional examples are described below. The various features and advantages of this invention will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 3 illustrates a flow distribution portion of the flow field plate.
FIG. 4 compares predicted distributions of flow between the channels for different sizes of the flow distribution region.

DETAILED DESCRIPTION OF THE PREFERRED EMBODIMENTS

Figure 1:
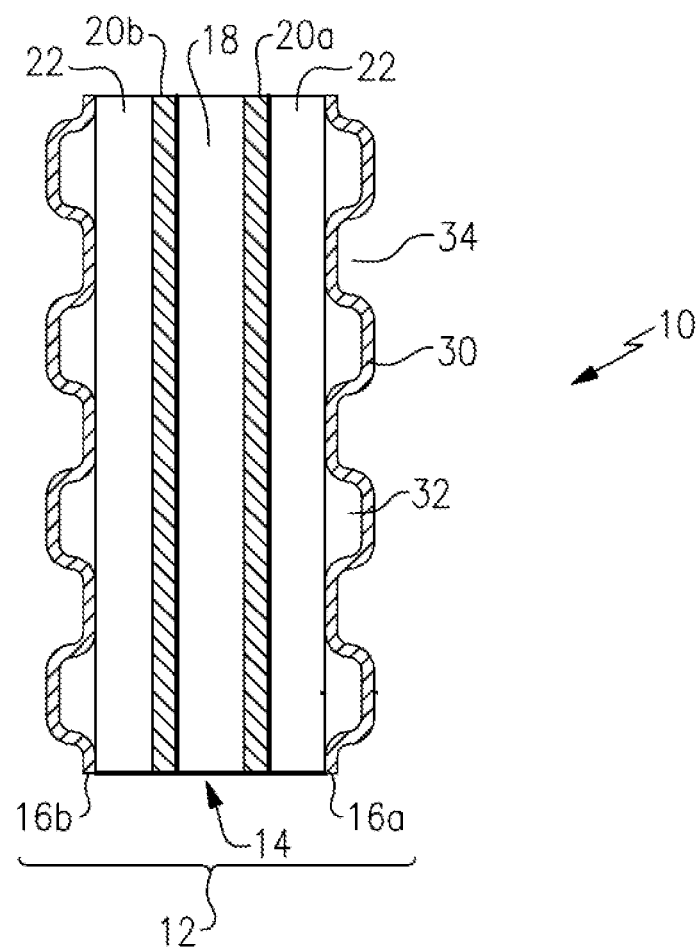
FIG. 1 illustrates an example fuel cell in cross section.

FIG. 1 illustrates a partially exploded view of selected portions of an example fuel cell 10 for generating an electric current in a known electrochemical reaction between reactant gases, for example. It is to be understood that the disclosed arrangement of the fuel cell 10 is only an example and that the concepts disclosed herein may be applied to other fuel cell arrangements.

The example fuel cell 10 includes one or more fuel cell units 12 that may be stacked in a known manner to provide the assembly of the fuel cell 10. Each of the fuel cell units 12 includes an electrode assembly 14 and flow field plates 16a and 16b for delivering reactant gases (e.g., air and hydrogen) to the electrode assembly 14. The flow field plate 16a may be regarded as an air plate for delivering air and the flow field plate 16b may be regarded as a fuel plate for delivering hydrogen. The flow field plate 16a, flow field plate 16b, or both may also circulate coolant in coolant channels that are isolated from the gas channels by the plate material on the "opposite" sides of plates for maintaining a desired operating temperature of the fuel cell 10 and hydrating the reactant gases indirectly by maintaining the electrode assembly 14 in a desired temperature range.

The electrode assembly 14 includes an electrolyte 18 between a cathode catalyst 20a and an anode catalyst 20b. Gas diffusion layers 22 may be used between the respective flow field plates 16a and 16b and the electrode assembly 14 to facilitate distribution of the reactant gases.

The flow field plates 16a and 16b may be substantially similar. Thus, the disclosed examples made with reference to the flow field plate 16a may also apply to the flow field plate 16b. In other examples, the flow field plate 16b may be different or include some of the same features as the flow field plate 16a.

The flow field plate 16a includes a non-porous plate body 30. Non-porous refers to the body being solid and free of pores that are known in porous plates for holding or transporting liquid water or other fluids. Thus, the non-porous plate body 30 is a barrier to fluids.

The non-porous plate body 30 includes reactant gas channels 32 and coolant channels 34. The reactant gas channels 32 are located on a side of the flow field plate 16a that faces in the direction of the electrode assembly 14 in the fuel cell unit 12 and the coolant channels 34 are located on the opposite side of the flow field plate 16a.

The flow field plate 16a may be stamped or otherwise formed into the desired shape. In this regard, positive features on one side of the flow field plate 16a are negative features on the other side, and vice versa. Stamping allows the flow field plate 16a to be made at a relatively low cost with a reduced need for machining operations, for example. The flow field plate 16a may be formed from steel, such as stainless steel, or other suitable alloy or material and may be coated with corrosion resistant material.

Figure 2:
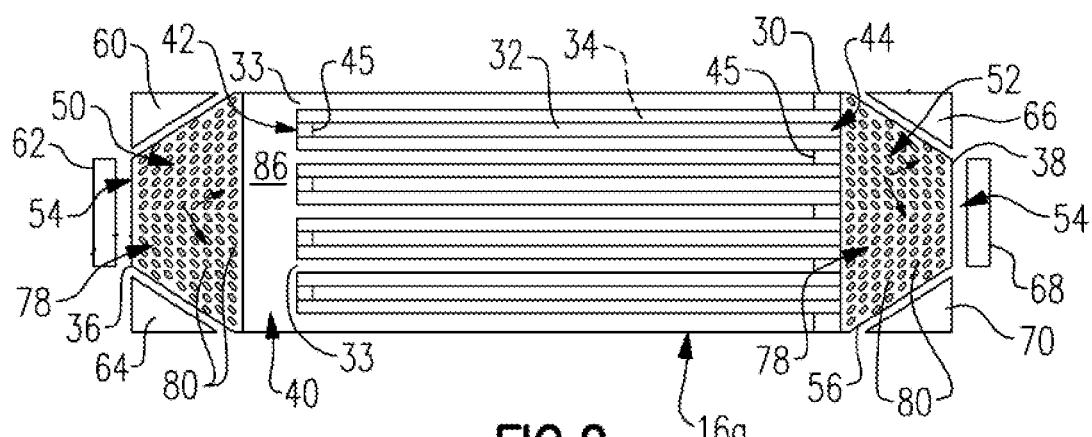
FIG. 2 illustrates an example flow field plate.

FIG. 2 illustrates one side of the flow field plate 16a. It is to be understood that the other side is the negative of the visible side. The channels 32 (positive side) and 34 (negative side) include inlets 42 (which while shown as restricted in the figure these channels may also have no restrictions) for receiving a fluid (reactant gas or coolant) and outlets 44 for discharging the fluid. Optionally, the reactant gas channels 32 may include obstructions 45 in some of the channel inlets 42 and channel outlets 44. The obstructions 45 may completely block the given channel inlets 42 and channel outlets 44 such that the reactant gas channels 32 are interdigitated. Alternatively, the obstructions 45 may partially block the given channel inlets 42 and channel outlets 44 such that the reactant gas channels 32 are partially interdigitated. Channels that are not blocked have a fully open inlet 33. Obstructions 45 can also be located at any point along the flow path, from inlet to outlet of the flow channels.

The flow field plate 16a extends between a first terminal end 36 and a second terminal end 38 of the non-porous plate body 30 and includes gap regions 86 for improving flow distribution (one shown). The term flow field as used in this disclosure may include any or all of the channels 32 and 34 for delivering the air, fuel, and coolant and any other area between the channels 32 and 34 and manifolds for transporting the air, fuel, or coolant. The reactant gas channels 32 may be regarded as a portion of the flow field for the reactant gas (e.g., air in the case of flow field plate 16a and fuel in the case of flow field plate 16b) and the coolant channels 34 may be regarded as a portion of the flow field for coolant.

The flow fields 40 may each include a first flow distribution portion 50 and a second flow distribution portion 52. The flow fields of the reactant gases cover active areas and may also include not active seal regions that are side by side with the electrode assembly 14, for delivering the reactant gases to the electrode assembly 14 for the electrochemical reaction. Thus, the first flow distribution portion 50 and the second flow distribution portion 52 are also side by side with a portion of the electrode assembly 14. In the illustrated example, the first flow distribution portion 50 diverges from the first terminal end 36 to the channel inlets 42, and the second flow distribution portion 52 converges from the channel outlets 44 to the second terminal end 38.

The flow field plate 16a includes another first flow distribution portion 50 and another second flow distribution portion 52 (as the negative) on the back side of the flow field plate 16a for distributing the coolant to and from the coolant channels 34.

In the illustrated example, the flow field plate 16a has an irregular octagonal shape to achieve the divergent and convergent shape. However, the shape is not limited to octagonal, and in other examples the flow field plate 16a may have a different polygonal shape or a non-polygonal shape, such as elliptical, to achieve the divergent and convergent shape.

The first flow distribution portion 50 and the second flow distribution portion 52 may each include a straight end wall 54 and two straight side walls 56 that non-perpendicularly extend from the straight end wall 54. The angle between the side walls 56 and the end wall 54 provides the respective diverging or converging shape. The angles shown may be varied, depending on a desired degree of divergence or convergence.

The diverging and converging shapes of the respective first flow distribution portion 50 and second flow distribution portion 52 facilitate distribution of a fluid to the portion of the flow field with channels. For instance, the flow of a fluid delivered into the first flow distribution portion 50 follows along the side walls 56 to the outer channels near the edges of the flow field plate 16a. If the side walls 56 were perpendicular to the straight end wall 54, the fluid would not flow smoothly near the corner and flow into the outer channels would be inhibited. By sloping the side walls 56 relative to the end wall 54 to create a divergent shape, the first flow distribution portion 50 more uniformly distributes the fluid to the channels. Likewise, the second flow distribution portion 52 converges and thereby funnels the fluid flowing from the channels to facilitate collection of the fluid.

The fuel cell 10 also includes manifolds 60, 62, 64, 66, 68, and 70 to deliver and collect reactant gas and coolant to and from the flow fields 40. The manifolds 60 and 64 are located near the side walls 56 of the first flow distribution portion 50, and the manifold 62 is located near the end wall 54. The manifolds 66 and 70 are located near the side walls 56 of the second flow distribution portion 52, and the manifold 68 is located near the end wall 54.

The individual manifolds 60, 62, 64, 66, 68, and 70 may be used as inlets for delivering the fuel, air, or coolant to a given flow field 40 or as outlets for collecting the fuel, air, or coolant from the given flow field 40 to facilitate fluid distribution or achieve other fuel cell objectives.

Referring also to FIG. 3, the first flow distribution portion 50, the second flow distribution portion 52, or both may include a flow guide 78 that establishes a desired flow distribution between a given manifold 60, 62, 64, 66, 68, and 70 and the channels. For example, the flow guide 78 may include protrusions 80 within the first flow distribution portion 50 and/or second flow distribution portion 52. The shape of the protrusions 80, arrangement of the protrusions 80, or both may contribute to establishing the desired flow distribution by limiting flow to or from selected reactant gas channels 32 and promoting flow to or from other of the reactant gas channels 32. Given this description, one of ordinary skill in the art will recognize particular shapes and arrangements to suit their particular needs.

The protrusions 80 may have a non-equiaxed cross-sectional shape though other shapes may be contemplated. In the given example, the configuration of the protrusions 80 in the first flow distribution portion 50 are arranged to diverge the inlet flow across the flow field so the flow distribution is uniform as it reaches the gap region 86, and the configuration of the protrusions 80 in the second flow distribution portion 52 converge the flow towards the manifold 68. The protrusions 80 are generally arranged in rows, but other arrangements are contemplated. In this example, the protrusions 80 have an oval cross-section. In other examples, the protrusions 80 may have other non-equiaxed or equiaxed cross-sectional shapes.

While the protrusions 80 in the first flow distribution portion 50 are intended to distribute the flow to the reactant channels 32 equally, the flow exiting the first flow distribution portion 50 tends to form an unequal flow pattern as indicated by illustrative bar line 84 in gap region 86. The bar line 84 is illustrative because protrusions 80 may have other shapes, manifold 62 may have other shapes and because the second flow distribution portion 52 may also have different shapes and differently shaped protrusions 80.

The gap 86 has, or can be defined by, a length L and a width W. The gap 86 allows the flow, shown by arrows 88 to enter into the channels 32 with a more uniform flow distribution. The lower resistance across the width W of the opening tends to equalize flow along the length L of the gap. Reactant flow along the channels remains homogenized due to mixing into and out of the channels 32, in the flow field and through the overlaid gas diffusion layer 22. This flow pattern also improves the uniformity of flow along the length of the flow channels 32.

Referring now to FIG. 4, the graph is shown in which oxidant flow is analyzed through channels depending on the width of the gap region 86. Each left bar 90 shows the flow in each channel without an opening or gap region 86. The flow in each middle bar 92 shows the flow in each channel with a 5 mm gap region 86. The flow in each right bar 94 shows the flow in each channel with a 25 mm gap region 86. The x-axis 96 shows the channel number from mid-plane of the flow field to edge. The y-axis 98 shows the relative flow passing through each channel. Because each channel is assumed to be 1 mm wide, each rib is assumed to be 0.7 mm wide and there are 60 channels edge to edge, the width of the fuel cell 10 is about 102 mm. One can see that as the gap region 86 widens from 0 to 25 mm the flow in the channels tends to equalize in that the flow in the channel 1, which is at the mid-plane, drops from about 1.3 to 1.2 and the flow in channel 30, which is close to the edge 100, rises from about 0.5 to about 0.63. Not surprisingly channel 16 tends to stay at approximately the average flow and the flows in the channels at the ends and the mid-plane tend to increase and diminish as the gap region 86 gets larger. Improved flow uniformity occurs when a ratio of length to width of the gap region 86 is as large as 20:1. A more preferred uniformity results from ratios of 4:1 and lower.

If the flow is not uniform, flow through the channels is not equal and the fuel cell cannot operate at optimum efficiency. With reactant flow maldistribution, the fuel cell may also require more parasitic power to move the reactant flow through the channels and decrease the efficiency of the fuel cell. The fuel cell may also suffer early failure if some channels do not get enough moisture entrained in reactant gases and therefore cause the membrane to dry and fail.

Although a combination of features is shown in the illustrated examples, not all of them need to be combined to realize the benefits of various embodiments of this invention. In other words, a system designed according to an embodiment of this invention will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for use in a fuel cell, comprising:
   a plurality of channels each having a respective inlet;
   a gap region fluidically coupled to the plurality of channels, the gap region defined by a length and a width such that a ratio of the length to the width is less than about 4:1; and
   a flow guide fluidically coupled to the gap region, the flow guide including a plurality of protrusions, the gap region being between the plurality of channels and the flow guide.

2. The device of claim 1 wherein said channels have at least some unrestricted inlets and at least some restricted inlets.

3. The device of claim 2 wherein the at least some restricted inlets have a restriction that is positioned further from the flow guide than at least some of the unrestricted inlets.

4. A method for use in a fuel cell comprising:
   directing a flow of a reactant through a flow guide of a flow field plate towards a gap region of the flow field plate, the flow guide including a plurality of protrusions, and the gap region defined by a length and a width such that a ratio of the length to the width is less than about 4:1; and
   directing said flow through said gap region towards a plurality of inlets of channels to increase a uniformity of a distribution pattern of the flow within said gap region.

5. The method of claim 4 wherein said channels have at least some unrestricted inlets and at least some restricted inlets.

6. The method of claim 5 wherein the at least some restricted inlets have a restriction that is positioned further from the flow guide than at least some of the unrestricted inlets.

* * * * *